(No Model.)
J. FORD.
EGG PRESERVING APPARATUS.
No. 438,073. Patented Oct. 7, 1890.
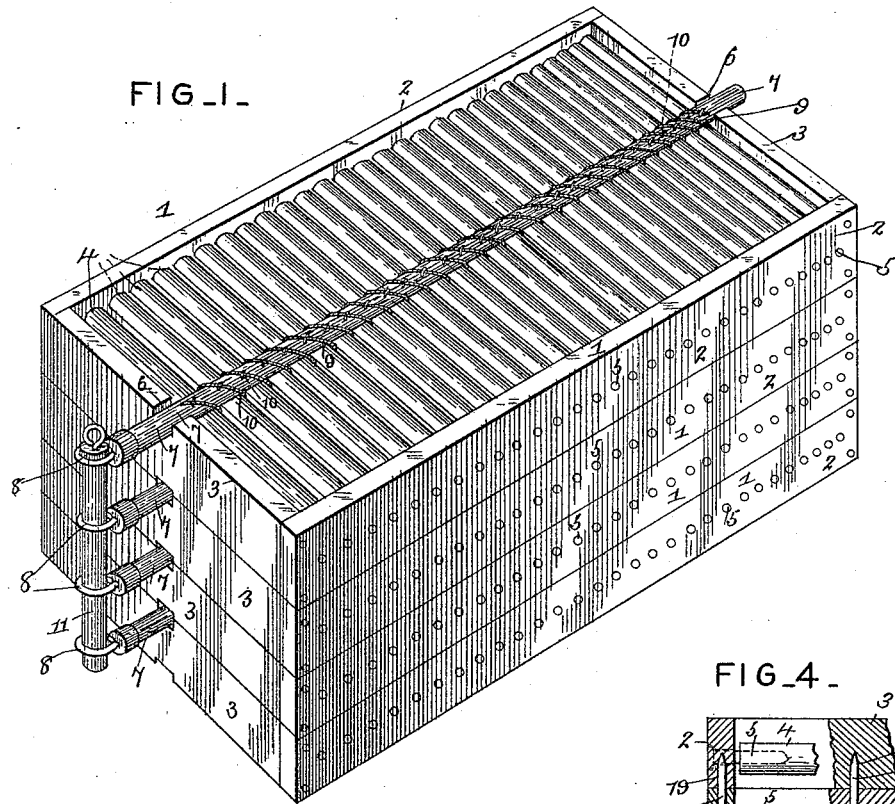
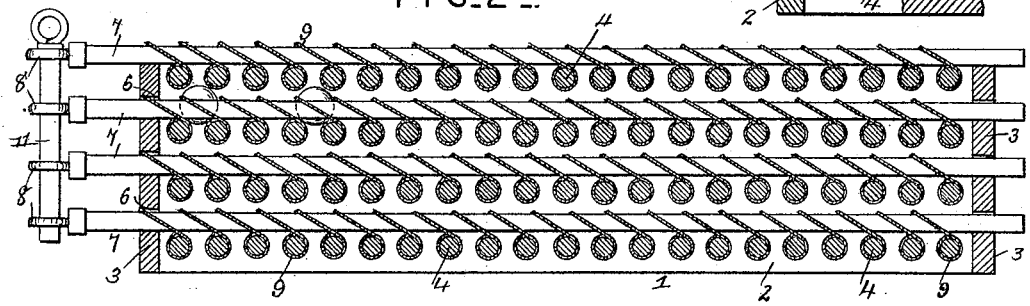
Witnesses:
Jas. K. McClathan
W. S. Duvall
Inventor
Joseph Ford
By his Attorneys,
C. A. Snow & Co.

UNITED STATES PATENT OFFICE.

JOSEPH FORD, OF PALMYRA, MICHIGAN.

EGG-PRESERVING APPARATUS.

SPECIFICATION forming part of Letters Patent No. 438,073, dated October 7, 1890.

Application filed May 12, 1890. Serial No. 351,495. (No model.)

*To all whom it may concern:*

Be it known that I, JOSEPH FORD, a citizen of the United States, residing at Palmyra, in the county of Lenawee and State of Michigan, have invented a new and useful Egg-Preserving Apparatus, of which the following is a specification.

This invention has relation to apparatus for preserving eggs and to that particular class in which the eggs are turned at intervals so as to prevent the yolks of the eggs from settling, and thus becoming spoiled.

The objects of my invention are to combine simplicity and cheapness with ease of operation and to provide an apparatus adapted to contain any number of eggs, which may be partially turned or rotated and that simultaneously and with ease.

With the above objects in view the invention consists in certain features of construction, hereinafter specified, and particularly pointed out in the claims.

Referring to the drawings, Figure 1 is a perspective. Fig. 2 is a longitudinal section. Fig. 3 is a similar detail view of a portion of one of the frames, a series of rollers, and a portion of the operating-rod. Fig. 4 is a detail in transverse section through one of the side rails of one of the frames.

Like numerals of reference indicate like parts in all the figures of the drawings.

In practicing my invention I construct the apparatus of as many rectangular frames 1 as may be desired and in accordance with the number of eggs the apparatus is to receive.

The frames 1 each comprises a pair of longitudinal side bars 2 and a pair of end bars 3, which connect said side bars.

Between each pair of longitudinal bars 2 there is journaled a series of loose rollers 4, said rollers, preferably, being formed of wood and spaced a short distance apart, as shown, the distance being too small to permit of an egg passing between a pair of rollers, or to permit of an egg becoming wedged between the same. The rollers are supported in position in this instance by a series of bearing-pins 5, passed through the side bars 2, and freely rotate thereupon. The diameters of the rollers are considerably less than the thickness or depth of the side bars, so that a tier of frames forms a series of egg-receiving spaces, as shown.

The opposite end bars 3 are at each side of their series of rollers provided with aligning recesses 6, and over each series of rollers there is mounted an operating-rod 7, which at its outer end is provided with an eye 8.

The operating-rods may be connected in any suitable manner to the series of rollers, whereby by a reciprocation of the rod said rollers are partially turned. In this instance I connect one end of a stout cord or rope to the operating-bar near its front end, as shown at 6, and then coil the cord or rope 9 around and over said bar and each successive roller, fastening the coils to the operating-bar and to the rollers at each point of crossing by small staples 10.

The entire series of eyes 8 are now connected by a vertical pin 11, which pin is removable for the purpose of permitting of a separation of the sections, and by said pin the entire series of—in this instance, four—operating-bars may be reciprocated, and in so doing will partially rotate the entire series of rollers.

In practice the eggs are placed between each pair of rollers, as illustrated in the drawings, and once or twice a week the entire series are simultaneously partially turned or rotated through the medium of the connecting-rods. In this manner, the apparatus being set in a cool cellar or other place, the yolks, which are the most perishable portion of the eggs, are maintained away from the shells of the eggs, and thus preserved by the whites of the eggs from the effects of the atmosphere.

The side and end bars of each of the frames at their upper edges are provided with dowel-pins 18, and the lower edges of the bars are provided with corresponding dowel-pin-receiving openings 19. In this manner the frames are held removably in position, and it is evident that other ordinary mechanical means may be readily devised for this purpose.

Having thus described my invention, what I claim is—

1. The combination, with the frame or section and the series of transverse loosely-journaled rolls, of a connecting-rod mounted above the rolls and an operating-cord having its ends connected to the rod near the ends of the same and intermediate its ends coiled loosely about the rod and each successive roller and connected to the rod and rollers at the points of crossing, substantially as specified.

2. In an egg-preserver, the combination, with a series of oblong frames mounted one upon the other, the end bars of the frames being provided at their upper and lower edges with aligning recesses, and loose rollers of a diameter less than the depth of the frames mounted in each of said frames, of a series of operating-rods mounted above each frame in the recesses and cords coiled about each of the rods and each of the rollers over which they are located and secured to the rollers and rods at their points of crossing, eyes secured at the ends of the rods, and a removable pin connecting the entire series of eyes, substantially as specified.

3. In an egg-preserver, the frame having a parallel series of rollers, combined with an operating-rod mounted at right angles to the rollers and cords wound on the rod and the rollers in reverse directions, whereby the movement of the rod will cause an oscillation of the rollers, as set forth.

In testimony that I claim the foregoing as my own I have hereto affixed my signature in presence of two witnesses.

JOSEPH FORD.

Witnesses:
A. W. SMITH,
R. R. ROBBINS.